United States Patent
Kato et al.

(10) Patent No.: US 10,233,301 B2
(45) Date of Patent: Mar. 19, 2019

(54) POLYMER COMPOSITION AND MOLDED BODY

(71) Applicant: ZEON CORPORATION, Chiyoda-ku, Tokyo (JP)

(72) Inventors: Masatsugu Kato, Tokyo (JP); Shinsuke Miyazawa, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 18 days.

(21) Appl. No.: 15/535,208

(22) PCT Filed: Jul. 30, 2015

(86) PCT No.: PCT/JP2015/071657
§ 371 (c)(1),
(2) Date: Jun. 12, 2017

(87) PCT Pub. No.: WO2016/103778
PCT Pub. Date: Jun. 30, 2016

(65) Prior Publication Data
US 2017/0321030 A1  Nov. 9, 2017

(30) Foreign Application Priority Data
Dec. 25, 2014 (JP) .................. 2014-261776

(51) Int. Cl.
| | | |
|---|---|---|
| *C08K 3/22* | (2006.01) | |
| *C08K 3/40* | (2006.01) | |
| *C08G 61/08* | (2006.01) | |
| *C08K 3/24* | (2006.01) | |
| *C08K 3/34* | (2006.01) | |
| *C08K 7/14* | (2006.01) | |
| *C08L 65/00* | (2006.01) | |

(52) U.S. Cl.
CPC ............... *C08K 3/22* (2013.01); *C08G 61/08* (2013.01); *C08K 3/24* (2013.01); *C08K 3/346* (2013.01); *C08K 3/40* (2013.01); *C08K 7/14* (2013.01); *C08L 65/00* (2013.01); *C08G 2261/3325* (2013.01); *C08G 2261/418* (2013.01); *C08G 2261/60* (2013.01); *C08G 2261/724* (2013.01); *C08K 2003/2251* (2013.01)

(58) Field of Classification Search
CPC .... C08K 3/22; C08K 3/40; C08K 2003/2251; C08K 3/346; C08K 7/14; C08K 3/24; C08L 65/00; C08G 61/08; C08G 2261/3325; C08G 2261/418; C08G 2261/724; C08G 2261/60
USPC .......................................................... 524/406
See application file for complete search history.

(56) References Cited

U.S. PATENT DOCUMENTS

| | | |
|---|---|---|
| 5,194,534 A | 3/1993 | Bell |
| 2004/0241422 A1 | 12/2004 | Naundorf et al. |
| 2011/0251326 A1 | 10/2011 | Van Hartingsveldt et al. |

FOREIGN PATENT DOCUMENTS

| | | |
|---|---|---|
| JP | H05345817 A | 12/1993 |
| JP | H08325440 A | 12/1996 |
| JP | 2004534408 A | 11/2004 |
| JP | 2006052333 A | 2/2006 |
| JP | 2010536947 A | 12/2010 |
| JP | 4973815 B2 | 7/2012 |
| JP | 2013256596 A | 12/2013 |
| JP | 2014065756 A | 4/2014 |
| WO | 2012033076 A1 | 3/2012 |

OTHER PUBLICATIONS

Sep. 8, 2015, International Search Report issued in the International Patent Application No. PCT/JP2015/071657.

*Primary Examiner* — Josephine L Chang
(74) *Attorney, Agent, or Firm* — Kenja IP Law PC

(57) ABSTRACT

The present invention is a polymer composition comprising a hydrogenated crystalline cycloolefin ring-opening polymer (A) that comprises a repeating unit derived from a polycyclic norbornene-based monomer that includes three or more rings, 5 to 100 parts by weight of a glass filler (B) based on 100 parts by weight of the hydrogenated crystalline cycloolefin ring-opening polymer (A), and 5 to 20 parts of a metal oxide (C) based on 100 parts by weight of the hydrogenated crystalline cycloolefin ring-opening polymer (A), and
a formed article.
The polymer composition according to the present invention exhibits excellent electrical properties (low dielectric loss tangent), excellent adhesion to plating, and excellent reflow heat resistance, and can maintain strength even when subjected to high-temperature/high-humidity conditions.

5 Claims, No Drawings

POLYMER COMPOSITION AND MOLDED BODY

TECHNICAL FIELD

The present invention relates to a polymer composition that includes an alicyclic structure-containing polymer that can produce a substrate that is suitable for a plating technique using a laser-direct-structuring (LDS) method, exhibits excellent electrical insulation properties and high strength, and exhibits excellent adhesion to plating even in a high-temperature/high-humidity environment.

BACKGROUND ART

An alicyclic structure-containing polymer is suitably used as an electrical insulating material in view of low dielectric loss tangent.

A substrate material that includes a synthetic resin (e.g., polybutylene terephthalate) and a metal oxide that forms metal nuclei upon application of electromagnetic radiation, is suitably used for a plating technique using a laser-direct-structuring (LDS) method that has been put to practical use and can easily form a finer circuit (see Patent Literature 1).

When a polycarbonate is used as the synthetic resin used for the substrate material that is used for the LDS method, the polycarbonate may be decomposed by the metal compound, whereby a decrease in melt stability may occur, and processing may become difficult. In order to solve this problem, use of a rubbery polymer such as an acrylonitrile-butadiene-styrene (ABS) rubber has been proposed (see Patent Literature 2). Patent Literature 2 discloses that it is desirable to mix titanium dioxide with a polycarbonate in order to increase the plating deposition amount and adhesion.

Patent Literature 3 discloses a resin forming (molding) material that includes a norbornene-based resin and a styrene-ethylene-propylene-styrene block copolymer rubber, and exhibits excellent impact resistance and excellent electrical properties.

CITATION LIST

Patent Literature

Patent Literature 1: JP-T-2004-534408 (US2004/0241422A1)
Patent Literature 2: JP-T-2010-536947 (US2011/0251326A1)
Patent Literature 3: JP-A-8-325440

SUMMARY OF INVENTION

Technical Problem

The inventors added the metal oxide disclosed in Patent Literature 1 or 2 that forms metal nuclei upon application of electromagnetic radiation, to the polymer composition disclosed in Patent Literature 3 that includes a norbornene-based resin and a styrene-ethylene-propylene-styrene block copolymer rubber, and formed plating using the LDS method. As a result, it was impossible to obtain sufficient adhesion to plating. When titanium dioxide that is disclosed in Patent Literature 2 as a particularly preferable inorganic filler was added, adhesion to plating was improved to some extent, but was still insufficient.

The invention was conceived in view of the above situation. An object of the invention is to implement excellent electrical properties (low dielectric loss tangent), excellent adhesion to plating, and excellent reflow heat resistance using a hydrogenated crystalline cycloolefin ring-opening polymer that includes a repeating unit derived from a polycyclic norbornene-based monomer that includes three or more rings, as a substrate material that is used for a plating technique using the LDS method.

Solution to Problem

The inventors conducted extensive studies in order to solve the above problem. As a result, the inventors found that a polymer composition that includes the hydrogenated crystalline cycloolefin ring-opening polymer, a glass filler (inorganic filler), and a specific metal oxide exhibits excellent electrical properties (low dielectric loss tangent), excellent adhesion to plating, and excellent reflow heat resistance, and can maintain strength even when subjected to high-temperature/high-humidity conditions. This finding has led to the completion of the invention.

One aspect of the invention provides a polymer composition including a hydrogenated crystalline cycloolefin ring-opening polymer (A) that includes a repeating unit derived from a polycyclic norbornene-based monomer that includes three or more rings, 5 to 100 parts by weight of a glass filler (B) based on 100 parts by weight of the hydrogenated crystalline cycloolefin ring-opening polymer (A), and 5 to 20 parts by weight of a metal oxide (C) based on 100 parts by weight of the hydrogenated crystalline cycloolefin ring-opening polymer (A).

It is preferable that the metal oxide be $CuCr_2O_4$ having a spinel structure.

It is preferable that the polymer composition further include 1 to 20 parts by weight of talc (D).

Another aspect of the invention provides a formed article that includes the polymer composition, and a formed article that includes the polymer composition, and functions as a high-frequency dielectric antenna.

DESCRIPTION OF EMBODIMENTS

A polymer composition and a formed article according to the exemplary embodiments of the invention are described in detail below.

Polymer Composition

A polymer composition according to one embodiment of the invention includes a hydrogenated crystalline cycloolefin ring-opening polymer (A) that includes a repeating unit derived from a polycyclic norbornene-based monomer that includes three or more rings (hereinafter may be referred to as "hydrogenated crystalline cycloolefin ring-opening polymer (A)"), 5 to 100 parts by weight of a glass filler (B) based on 100 parts by weight of the hydrogenated crystalline cycloolefin ring-opening polymer (A), and 5 to 20 parts by weight of a metal oxide (C) based on 100 parts by weight of the hydrogenated crystalline cycloolefin ring-opening polymer (A).

Hydrogenated Crystalline Cycloolefin Ring-opening Polymer (A)

The hydrogenated crystalline cycloolefin ring-opening polymer (A) used in connection with one embodiment of the invention is obtained by subjecting a monomer that includes at least a polycyclic norbornene-based monomer that includes three or more rings (hereinafter may be referred to as "polycyclic norbornene-based monomer") to ring-opening polymerization, and hydrogenating the main-chain carbon-carbon double bonds of the resulting ring-opening polymer, and has crystallinity.

The hydrogenated crystalline cycloolefin ring-opening polymer (A) may be produced using an arbitrary method. For example, the hydrogenated crystalline cycloolefin ring-opening polymer (A) may be produced using the method disclosed in JP-A-2006-52333. The method disclosed in JP-A-2006-52333 subjects a norbornene-based monomer that includes three or more rings to solution polymerization using a Group 6 transition metal compound as a polymerization catalyst to obtain a cycloolefin ring-opening polymer that has syndiotacticity, and hydrogenating the main-chain carbon-carbon double bonds of the ring-opening polymer to efficiently produce the desired hydrogenated crystalline cycloolefin ring-opening polymer (A).

The crystalline cycloolefin ring-opening polymer used in connection with one embodiment of the invention may be produced using at least a polycyclic norbornene-based monomer that includes three or more rings as a monomer.

The term "polycyclic norbornene-based monomer that includes three or more rings" used herein refers to a norbornene-based compound that includes a norbornene skeleton, and one or more cyclic structures that are fused with the norbornene skeleton, in the molecule. Specifically, the polycyclic norbornene-based monomer that includes three or more rings refers to a norbornene-based monomer that includes a norbornene ring, and one or more rings that are fused with the norbornene ring, in the molecule. A compound represented by the following formula (1) or (2) is particularly preferable as the polycyclic norbornene-based monomer from the viewpoint of ensuring that a formed article produced using the polymer composition exhibits excellent heat resistance.

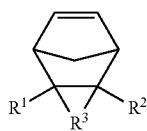

(1)

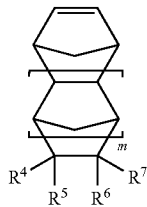

(2)

Each of $R^1$, $R^2$, and $R^4$ to $R^7$ in the formulas (1) and (2) independently represents a hydrogen atom, a halogen atom, a substituted or unsubstituted hydrocarbon group having 1 to 20 carbon atoms, or a substituent that includes a silicon atom, an oxygen atom, or a nitrogen atom, provided that $R^1$ and $R^2$ and $R^4$ and $R^6$ are optionally bonded to each other to form a ring.

Examples of the halogen atom that may be represented by $R^1$, $R^2$, and $R^4$ to $R^7$ include a fluorine atom, a chlorine atom, a bromine atom, and the like.

Examples of the hydrocarbon group having 1 to 20 carbon atoms (that is substituted or unsubstituted) include an alkyl group such as a methyl group, an ethyl group, a propyl group, an isopropyl group, a butyl group, an isobutyl group, a sec-butyl group, a tert-butyl group, a pentyl group, an isopentyl group, a hexyl group, a heptyl group, an octyl group, a nonyl group, and a decyl group; a cycloalkyl group such as a cyclopropyl group, a cyclobutyl group, a cyclopentyl group, a cyclohexyl group, and a cycloheptyl group; an alkenyl group such as a vinyl group, a 1-propenyl group, an allyl group, a 1-butenyl group, a 2-butenyl group, a pentenyl group, a hexenyl group, and a cyclohexenyl group; an alkynyl group such as an ethynyl group, a 1-propynyl group, a 2-propynyl (propargyl) group, a 3-butynyl group, a pentynyl group, and a hexynyl group; an aryl group such as a phenyl group, a tolyl group, a xylyl group, a biphenylyl group, a 1-naphthyl group, a 2-naphthyl group, an anthryl group, and a phenanthryl group; an aralkyl group such as a benzyl group and a phenethyl group; and the like.

Examples of a substituent that may substitute the hydrocarbon group having 1 to 20 carbon atoms include a halogen atom such as a fluorine atom and a chlorine atom; an alkoxy group such as a methoxy group and an ethoxy group; and the like.

$R^3$ represents a substituted or unsubstituted divalent hydrocarbon group having 1 to 20 carbon atoms.

Examples of the divalent hydrocarbon group having 1 to 20 carbon atoms (that is substituted or unsubstituted) that is represented by $R^3$ include an alkylene group such as a methylene group and an ethylene group; an alkenylene group such as a vinylene group; an alkynylene group such as an ethynylene group; an arylene group such as a phenylene group; a combination thereof; and the like. Examples of a substituent that may substitute the divalent hydrocarbon group having 1 to 20 carbon atoms include those mentioned above in connection with the hydrocarbon group that may be represented by $R^1$, $R^2$, and $R^4$ to $R^7$.

m is 1 or 2.

Specific examples of the polycyclic norbornene-based monomer represented by the formula (1) include dicyclopentadiene, methyldicyclopentadiene, tricyclo[5.2.1.0$^{2,6}$] dec-8-ene, tetracyclo[9.2.1.0$^{2,10}$.0$^{3,8}$]tetradeca-3,5,7,12-tetraene (also referred to as "1,4-methano-1,4,4a,9a-tetrahydro-9H-fluorene"), tetracyclo[10.2.1.0$^{2,11}$.0$^{4,9}$] pentadeca-4,6,8,13-tetraene (also referred to as "1,4-methano-1,4,4a,9,9a,10-hexahydroanthracene"), and the like.

Examples of the polycyclic norbornene-based monomer represented by the formula (2) include tetracyclododecenes (m=1); and hexacycloheptadecenes (m=2).

Specific examples of tetracyclododecenes include unsubstituted tetracyclododecene and tetracyclododecenes that is substituted with an alkyl group, such as tetracyclododecene, 8-methyltetracyclododecene, 8-ethyltetracyclododecene, 8-cyclohexyltetracyclododecene, and 8-cyclopentyltetracyclododecene; tetracyclododecenes that includes a double bond outside the ring, such as 8-methylidenetetracyclododecene, 8-ethylidenetetracyclododecene, 8-vinyltetracyclododecene, 8-propenyltetracyclododecene, 8-cyclohexenyltetracyclododecene, and 8-cyclopentenyltetracyclododecene; tetracyclododecenes that is substituted with an aromatic ring, such as 8-phenyltetracyclododecene; tetracyclododecenes that is substituted with a substituent that includes an oxygen atom, such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarboxylic acid, and tetracyclododecene-8,9-dicarboxylic anhydride; tetracyclododecenes that is substituted with a substituent that includes a nitrogen atom, such as 8-cyanotetracyclododecene and tetracyclododecene-8,9-dicarboxylic acid imide; tetracyclododecenes that is substituted with a substituent that includes a halogen atom, such as 8-chlorotetracyclododecene; tetracyclododecenes that is substituted with a substituent that includes a silicon atom, such as 8-trimethoxysilyltetracyclododecene; and the like.

Specific examples of hexacycloheptadecenes include unsubstituted hexacycloheptadecene and hexacycloheptadecenes that is substituted with an alkyl group, such as hexacycloheptadecene, 12-methylhexacycloheptadecene, 12-ethylhexacycloheptadecene, 12-cyclohexylhexacycloheptadecene, and 12-cyclopentylhexacycloheptadecene; hexacycloheptadecenes that includes a double bond outside the ring, such as 12-methylidenehexacycloheptadecene, 12-ethylidenehexacycloheptadecene, 12-vinylhexacycloheptadecene, 12-propenylhexacycloheptadecene, 12-cyclohexenylhexacycloheptadecene, and 12-cyclopentenylhexacycloheptadecene; hexacycloheptadecenes that is substituted with an aromatic ring, such as 12-phenylhexacycloheptadecene; hexacycloheptadecenes that is substituted with a substituent that includes an oxygen atom, such as 12-methoxycarbonylhexacycloheptadecene, 12-methyl-12-methoxycarbonylhexacycloheptadecene, 12-hydroxymethylhexacycloheptadecene, 12-carboxyhexacycloheptadecene, hexacycloheptadecene-12,13-dicarboxylic acid, and hexacycloheptadecene-12,13-dicarboxylic anhydride; hexacycloheptadecenes that is substituted with a substituent that includes a nitrogen atom, such as 12-cyanohexacycloheptadecene and hexacycloheptadecene-12,13-dicarboxylic acid imide; hexacycloheptadecenes that is substituted with a substituent that includes a halogen atom, such as 12-chlorohexacycloheptadecene; hexacycloheptadecenes that is substituted with a substituent that includes a silicon atom, such as 12-trimethoxysilylhexacycloheptadecene; and the like.

These polycyclic norbornene-based monomers may be used either alone or in combination.

It is preferable to use a polycyclic norbornene-based monomer mixture that includes dicyclopentadiene in a ratio of 50 wt % or more, and more preferable to use dicyclopentadiene alone, from the viewpoint of improving the crystallinity of the hydrogenated cycloolefin ring-opening polymer, and ensuring that the resulting formed article exhibits excellent heat resistance.

The polycyclic norbornene-based monomer may be present in the form of an endo-stereoisomer or an exo-stereoisomer, and both the endo-stereoisomer and the exo-stereoisomer can be used as the monomer. Either the endo-stereoisomer or the exo-stereoisomer may be used alone, or an isomer mixture that includes the endo-stereoisomer and the exo-stereoisomer in an arbitrary ratio may be used. Note that it is preferable to increase the ratio of the endo-stereoisomer or the exo-stereoisomer from the viewpoint of improving the crystallinity of the hydrogenated cycloolefin ring-opening polymer, and obtaining a polymer composition that exhibits excellent heat resistance. For example, it is preferable to set the ratio of the endo-stereoisomer or the exo-stereoisomer to 80% or more, more preferably 90% or more, and particularly preferably 95% or more. Note that it is preferable to increase the ratio of the endo-stereoisomer from the viewpoint of ease of synthesis.

The cycloolefin ring-opening polymer may be produced by copolymerizing the polycyclic norbornene-based monomer with a monomer other than the polycyclic norbornene-based monomer as long as a polymer that has crystallinity is obtained. Examples of the monomer that may be copolymerized with the polycyclic norbornene-based monomer include a bicyclic norbornene-based compound that does not include a cyclic structure that is fused with the norbornene skeleton, a monocycloolefin, a cyclic diene, and derivatives thereof.

Specific examples of the bicyclic norbornene-based compound that does not include a cyclic structure that is fused with the norbornene skeleton, include unsubstituted norbornene and norbornenes that is substituted with an alkyl group, such as norbornene, 5-methylnorbornene, 5-ethylnorbornene, 5-butylnorbornene, 5-hexylnorbornene, 5-decylnorbornene, 5-cyclohexylnorbornene, and 5-cyclopentylnorbornene; norbornenes that is substituted with an alkenyl group, such as 5-ethylidenenorbornene, 5-vinylnorbornene, 5-propenylnorbornene, 5-cyclohexenylnorbornene, and 5-cyclopentenylnorbornene; norbornenes that is substituted with an aromatic ring, such as 5-phenylnorbornene; norbornenes that is substituted with a polar group that includes an oxygen atom, such as 5-methoxycarbonylnorbornene, 5-ethoxycarbonylnorbornene, 5-methyl-5-methoxycarbonylnorbornene, 5-methyl-5-ethoxycarbonylnorbornene, norbornenyl-2-methyl propionate, norbornenyl-2-methyl octanate, 5-hydroxymethylnorbornene, 5,6-di(hydroxymethyl)norbornene, 5,5-di(hydroxymethyl)norbornene, 5-hydroxy-i-propylnorbornene, 5,6-dicarboxynorbornene, and 5-methoxycarbonyl-6-carboxynorbornene; a norbornenes that is substituted with a polar group that includes a nitrogen atom, such as 5-cyanonorbornene; and the like.

Specific examples of the monocycloolefin include cyclohexene, cycloheptene, and cyclooctene.

Specific examples of the cyclic diene include cyclohexadiene and cycloheptadiene.

It is preferable that the monomer used to produce the cycloolefin ring-opening polymer that is subjected to a hydrogenation reaction include the polycyclic norbornene-based monomer in a ratio of 80 wt % or more, and it is more preferable to use substantially only the polycyclic norbornene-based monomer as the monomer used to produce the cycloolefin ring-opening polymer that is subjected to hydrogenation, from the viewpoint of improving the crystallinity of the hydrogenated cycloolefin ring-opening polymer, and ensuring that the resulting formed article exhibits excellent heat resistance.

A hydrogenated cycloolefin ring-opening polymer that has syndiotacticity is obtained by hydrogenating a cycloolefin ring-opening polymer that has syndiotacticity.

Therefore, it is necessary to use a ring-opening polymerization catalyst that can provide the cycloolefin ring-opening polymer with syndiotacticity when subjecting the polycyclic norbornene-based monomer to ring-opening polymerization. The ring-opening polymerization catalyst is not particularly limited as long as the ring-opening polymerization catalyst can provide the cycloolefin ring-opening polymer with syndiotacticity. It is preferable to use a ring-opening polymerization catalyst that includes a metal compound represented by the following formula (3) (hereinafter may be referred to as "metal compound (3)").

$$M(NR^8)X_{4-a}(OR^9)_a \cdot L_b \quad (3)$$

wherein M is a metal atom selected from the Group 6 transition metal atoms in the periodic table, $R^8$ is a phenyl group that is unsubstituted or substituted at at least one of the positions 3, 4, and 5, or a group represented by $CH_2R^{10}$, $R^9$ is a group selected from a substituted or unsubstituted alkyl group and a substituted or unsubstituted aryl group, X is a group selected from a halogen atom, an alkyl group, an aryl group, and an alkylsilyl group, L is a neutral electron donor ligand, a is 0 or 1, b is an integer from 0 to 2, and $R^{10}$ is a hydrogen atom, or a group selected from a substituted or unsubstituted alkyl group and a substituted or unsubstituted aryl group.

The metal atom (M) included in the metal compound (3) is selected from the Group 6 transition metal atoms (chromium, molybdenum, and tungsten) in the periodic table. Among these, molybdenum and tungsten are preferable, and tungsten is particularly preferable.

The metal compound (3) includes a metal-imide bond. $R^8$ is a substituent that is bonded to the nitrogen atom that forms the metal-imide bond.

Examples of a substituent that may substitute the phenyl group that is unsubstituted or substituted at at least one of the positions 3, 4, and 5, include an alkyl group such as a methyl group and an ethyl group; a halogen atom such as a fluorine atom, a chlorine atom, and a bromine atom; an alkoxy group such as a methoxy group, an ethoxy group, and an isopropoxy group; and the like. Note that substituents that substitute the phenyl group at at least two of the positions 3, 4, and 5 may be bonded to each other.

Specific examples of the phenyl group that is unsubstituted or substituted at at least one of the positions 3, 4, and 5, include a phenyl group; a monosubstituted phenyl group such as a 4-methylphenyl group, a 4-chlorophenyl group, a 3-methoxyphenyl group, a 4-cyclohexylphenyl group, and a 4-methoxyphenyl group; a disubstituted phenyl group such as a 3,5-dimethylphenyl group, a 3,5-dichlorophenyl group, a 3,4-dimethylphenyl group, and a 3,5-dimethoxyphenyl group; a trisubstituted phenyl group such as a 3,4,5-trimethylphenyl group and a 3,4,5-trichlorophenyl group; and a substituted or unsubstituted 2-naphthyl group such as a 2-naphthyl group, a 3-methyl-2-naphthyl group, and a 4-methyl-2-naphthyl group.

The number of carbon atoms included in the substituted or unsubstituted alkyl group that may be represented by $R^{10}$ (included in the group represented by $CH_2R^{10}$ (that may be used as the substituent ($R^8$ in the formula (3)) that is bonded to the nitrogen atom included in the metal compound (3))) is not particularly limited. The number of carbon atoms included in the substituted or unsubstituted alkyl group is normally 1 to 20, and preferably 1 to 10. The alkyl group may be either linear or branched.

Examples of a substituent that may substitute the alkyl group include, but are not limited to, a substituted or unsubstituted phenyl group such as a phenyl group and a 4-methylphenyl group; and an alkoxy group such as a methoxy group and an ethoxy group.

Examples of the substituted or unsubstituted aryl group that may be represented by $R^{10}$ include a phenyl group, a 1-naphthyl group, a 2-naphthyl group, and the like. A substituent that may substitute the aryl group is not particularly limited. Examples of a substituent that may substitute the aryl group include a substituted or unsubstituted phenyl group such as a phenyl group and a 4-methylphenyl group; an alkoxy group such as a methoxy group and an ethoxy group; and the like.

$R^{10}$ is preferably an alkyl group having 1 to 20 carbon atoms, such as a methyl group, an ethyl group, a propyl group, an isopropyl group, a butyl group, an isobutyl group, a t-butyl group, a pentyl group, a hexyl group, an octyl group, or a decyl group.

The metal compound (3) includes three or four groups selected from a halogen atom, an alkyl group, an aryl group, and an alkylsilyl group. Specifically, X in the formula (3) is a group selected from a halogen atom, an alkyl group, an aryl group, and an alkylsilyl group. Note that the metal compound (3) may have a structure in which two or more groups represented by X are bonded to each other.

Examples of the halogen atom that may be represented by X include a chlorine atom, a bromine atom, and an iodine atom. Examples of the alkyl group include a methyl group, an ethyl group, a propyl group, an isopropyl group, a butyl group, an isobutyl group, a t-butyl group, a pentyl group, a neopentyl group, a benzyl group, a neophyl group, and the like. Examples of the aryl group include a phenyl group, a 4-methylphenyl group, a 2,6-dimethylphenyl group, a 1-naphthyl group, a 2-naphthyl group, and the like. Examples of the alkylsilyl group include a trimethylsilyl group, a triethylsilyl group, a t-butyldimethylsilyl group, and the like.

The metal compound (3) may include one metal-alkoxide bond or one metal-aryloxide bond. The substituent ($R^9$ in the formula (3)) that is bonded to the oxygen atom that forms the metal-alkoxide bond or the metal-aryloxide bond is a group selected from a substituted or unsubstituted alkyl group and a substituted or unsubstituted aryl group. Examples of the substituted or unsubstituted alkyl group and the substituted or unsubstituted aryl group that may be represented by $R^9$ include those mentioned above in connection with $R^{10}$.

The metal compound (3) may include one or two neutral electron donor ligands. Examples of the neutral electron donor ligand (L in the formula (3)) include an electron donor compound that includes an element (atom) among the Groups 15 and 16 elements in the periodic table. Specific examples of the neutral electron donor ligand include phosphines such as trimethylphosphine, triisopropylphosphine, tricyclohexylphosphine, and triphenylphosphine; ethers such as diethyl ether, dibutyl ether, 1,2-dimethoxyethane, and tetrahydrofuran; amines such as trimethylamine, triethylamine, pyridine, and lutidine; and the like. Among these, ethers are particularly preferable.

Examples of the metal compound (3) that may particularly preferably be used as the ring-opening polymerization catalyst used to produce a cycloolefin ring-opening polymer that has syndiotacticity, include a tungsten compound that includes a phenylimide group (i.e., a compound represented by the formula (3) wherein M is a tungsten atom, and $R^8$ is a phenyl group). It is particularly preferable to use tetrachlorotungsten phenylimide-(tetrahydrofuran).

The metal compound (3) may be synthesized by mixing an oxyhalogenated product of a Group 6 transition metal, phenyl isocyanates that is unsubstituted or substituted at at least one of the positions 3, 4, and 5 (or monosubstituted methyl isocyanates), and a neutral electron donor ligand (L) optionally together with alcohols, a metal alkoxide, or a metal aryloxide (e.g., the method disclosed in JP-A-5-345817), for example. The metal compound (3) thus synthesized may be purified and isolated by crystallization or the like, or the resulting solution may be used directly as the ring-opening polymerization catalyst without purification.

The metal compound (3) (ring-opening polymerization catalyst) is used in such an amount that the molar ratio (metal compound (3):entire monomer) of the metal compound (3) to the entire monomer is normally 1:100 to 1:2,000,000, preferably 1:500 to 1:1,000,000, and more preferably 1:1,000 to 1:500,000. If the amount of the catalyst is too large, it may be difficult to remove the catalyst. If the amount of the catalyst is too small, sufficient polymerization activity may not be obtained.

The metal compound (3) may be used alone as the ring-opening polymerization catalyst. Note that it is preferable to use an organometallic reducing agent in combination with the metal compound (3) from the viewpoint of improving the polymerization activity.

Examples of the organometallic reducing agent include a compound that includes an element among the Groups 1, 2, 12, 13, and 14 elements in the periodic table, and a hydrocarbon group having 1 to 20 carbon atoms. It is preferable to use an organolithium, an organomagnesium, an organozinc, an organoaluminum, or an organotin. It is particularly preferable to use an organoaluminum or an organotin.

Examples of the organolithium include n-butyllithium, methyllithium, phenyllithium, and the like. Examples of the organomagnesium include butylethylmagnesium, butyloctylmagnesium, dihexylmagnesium, ethylmagnesium chloride, n-butylmagnesium chloride, allylmagnesium bromide, and the like. Examples of the organozinc include dimethylzinc, diethylzinc, diphenylzinc, and the like. Examples of the organoaluminum include trimethylaluminum, triethylaluminum, triisobutylaluminum, diethylaluminum chloride, ethylaluminum sesquichloride, ethylaluminum dichloride, diethylaluminum ethoxide, diisobutylaluminum isobutoxide, ethylaluminum diethoxide, isobutylaluminum diisobutoxide, and the like. Examples of the organotin include tetramethyltin, tetra(n-butyl)tin, tetraphenyltin, and the like.

The organometallic reducing agent is preferably used in a 0.1 to 100-fold amount, more preferably a 0.2 to 50-fold amount, and particularly preferably a 0.5 to 20-fold amount (on a molar basis), based on the amount of the metal compound (3). If the amount of the organometallic reducing agent is too small, the polymerization activity may not be improved. If the amount of the organometallic reducing agent is too large, a side reaction may easily occur.

The polymerization reaction for producing the crystalline cycloolefin ring-opening polymer is normally effected in an organic solvent. The organic solvent is not particularly limited as long as the organic solvent can dissolve or disperse the target ring-opening polymer (or a hydrogenated product thereof) under specific conditions, and does not hinder the polymerization reaction and the hydrogenation reaction.

Specific examples of the organic solvent include an aliphatic hydrocarbon such as pentane, hexane, and heptane; an alicyclic hydrocarbon such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; an aromatic hydrocarbon such as benzene, toluene, and xylene; a halogen-containing aliphatic hydrocarbon such as dichloromethane, chloroform, and 1,2-dichloroethane; a halogen-containing aromatic hydrocarbon such as chlorobenzene and dichlorobenzene; a nitrogen-containing hydrocarbon-based solvent such as nitromethane, nitrobenzene, and acetonitrile; ethers such as diethyl ether and tetrahydrofuran; and a mixed solvent thereof. Among these, an aromatic hydrocarbon, an aliphatic hydrocarbon, an alicyclic hydrocarbon, and ethers are preferable.

The ring-opening polymerization reaction may be initiated by mixing the monomer and the metal compound (3) optionally together with the organometallic reducing agent. These components may be added in an arbitrary order. For example, a mixture that includes the metal compound (3) and the organometallic reducing agent may be added to the monomer, and the resulting mixture may be mixed, or a mixture that includes the monomer and the metal compound (3) may be added to the organometallic reducing agent, and the resulting mixture may be mixed, or the metal compound (3) may be added to a mixture that includes the monomer and the organometallic reducing agent, and the resulting mixture may be mixed.

Each component may be added at one time, or may be added stepwise. Each component may be added continuously over a relatively long time (e.g., 1 minute or more). It is preferable to add the monomer or the metal compound (3) either stepwise or continuously from the viewpoint of controlling the polymerization temperature and the molecular weight of the resulting ring-opening polymer, and obtaining a polymer composition that exhibits excellent formability. It is particularly preferable to add the monomer either stepwise or continuously.

The monomer concentration in the organic solvent during the polymerization reaction is not particularly limited, but is preferably 1 to 50 wt %, more preferably 2 to 45 wt %, and particularly preferably 3 to 40 wt %. If the monomer concentration is too low, the polymer productivity may decrease. If the monomer concentration is too high, the viscosity of the polymer solution may increase to a large extent, and it may be difficult to effect the subsequent hydrogenation reaction.

An activity modifier may be added to the polymerization system. The activity modifier may be used to stabilize the ring-opening polymerization catalyst, and adjust the rate of the polymerization reaction and the molecular weight distribution of the polymer. The activity modifier is not particularly limited as long as the activity modifier is an organic compound that includes a functional group. It is preferable to use an oxygen-containing organic compound, a nitrogen-containing organic compound, or a phosphorus-containing organic compound, as the activity modifier. Specific examples of the activity modifier include ethers such as diethyl ether, diisopropyl ether, dibutyl ether, anisole, furan, and tetrahydrofuran; ketones such as acetone, benzophenone, and cyclohexanone; esters such as ethyl acetate; nitriles such as acetonitrile and benzonitrile; amines such as triethylamine, triisopropylamine, quinuclidine, and N,N-diethylaniline; pyridines such as pyridine, 2,4-lutidine, 2,6-lutidine, and 2-t-butylpyridine; phosphines such as triphenylphosphine and tricyclohexylphosphine; phosphates such as trimethyl phosphate and triphenyl phosphate; phosphine oxides such as triphenylphosphine oxide; and the like. These activity modifiers may be used either alone or in combination. The activity modifier may be added in an arbitrary amount. The activity modifier is normally added in a ratio of 0.1 to 100 mol % based on the metal compound that is used as the ring-opening polymerization catalyst.

A molecular weight modifier may be added to the polymerization system in order to adjust the molecular weight of the ring-opening polymer. Examples of the molecular weight modifier include a-olefins such as 1-butene, 1-pentene, 1-hexene, and 1-octene; an aromatic vinyl compound such as styrene and vinyltoluene; an oxygen-containing vinyl compound such as ethyl vinyl ether, isobutyl vinyl ether, allyl glycidyl ether, allyl acetate, allyl alcohol, and glycidyl methacrylate; a halogen-containing vinyl compound such as arylchloride; a nitrogen-containing vinyl compound such as acrylamide; a nonconjugated diene such as 1,4-pentadiene, 1,4-hexadiene, 1,5-hexadiene, 1,6-heptadiene, 2-methyl-1,4-pentadiene, and 2,5-dimethyl-1,5-hexadiene; and a conjugated diene such as 1,3-butadiene, 2-methyl-1,3-butadiene, 2,3-dimethyl-1,3-butadiene, 1,3-pentadiene, and 1,3-hexadiene.

The amount of the molecular weight modifier may be determined taking account of the desired molecular weight.

The molecular weight modifier is normally added in a ratio of 0.1 to 50 mol % based on the monomer.

The polymerization temperature is not particularly limited, but is normally −78 to +200° C., and preferably −30 to +180° C. The polymerization time is not particularly limited, and is determined taking account of the reaction scale. The polymerization time is normally 1 minute to 1,000 hours.

A cycloolefin ring-opening polymer that has syndiotacticity can be obtained by subjecting the monomer including the polycyclic norbornene-based monomer to ring-opening polymerization under the above conditions using the ring-opening polymerization catalyst that includes the metal compound (3).

The ratio of racemo diads in the cycloolefin ring-opening polymer (that is subjected to the hydrogenation reaction) is not particularly limited, but is normally 60% or more, preferably 65% or more, and more preferably 70 to 99%. The ratio of racemo diads (i.e., the degree of syndiotacticity) in the crystalline cycloolefin ring-opening polymer can be adjusted by appropriately selecting the type of ring-opening polymerization catalyst, for example.

The weight average molecular weight (polystyrene-equivalent weight average molecular weight) (Mw) of the crystalline cycloolefin ring-opening polymer (that is subjected to the hydrogenation reaction) determined by gel permeation chromatography is not particularly limited, but is preferably 10,000 to 100,000, and more preferably 15,000 to 80,000. A hydrogenated crystalline cycloolefin ring-opening polymer (A) produced using the crystalline cycloolefin ring-opening polymer having a weight average molecular weight within the above range exhibits excellent formability, and can produce a formed article that exhibits excellent heat resistance. The weight average molecular weight of the crystalline cycloolefin ring-opening polymer can be adjusted by adjusting the amount of the molecular weight modifier used during polymerization, for example.

The molecular weight distribution (i.e., the ratio (Mw/Mn)) of the polystyrene-equivalent weight average molecular weight to the polystyrene-equivalent number average molecular weight determined by gel permeation chromatography) of the crystalline cycloolefin ring-opening polymer (that is subjected to the hydrogenation reaction) is not particularly limited, but is preferably 1.5 to 4.0, and more preferably 1.6 to 3.5. A hydrogenated crystalline cycloolefin ring-opening polymer (A) produced using the crystalline cycloolefin ring-opening polymer having a molecular weight distribution within the above range exhibits excellent formability.

The molecular weight distribution of the hydrogenated crystalline cycloolefin ring-opening polymer (A) can be adjusted by appropriately selecting the monomer addition method and adjusting the monomer concentration when effecting the ring-opening polymerization reaction.

The crystalline cycloolefin ring-opening polymer (i.e., the main-chain carbon-carbon double bonds of the crystalline cycloolefin ring-opening polymer) may be hydrogenated by supplying hydrogen to the reaction system in the presence of a hydrogenation catalyst. A hydrogenation catalyst that is normally used when hydrogenating an olefin compound may be used as the hydrogenation catalyst. Examples of the hydrogenation catalyst include the following.

Examples of a homogeneous catalyst include a catalyst system that includes a combination of a transition metal compound and an alkali metal compound, such as a combination of cobalt acetate and triethylaluminum, a combination of nickel acetylacetonate and triisobutylaluminum, a combination of titanocene dichloride and n-butyllithium, a combination of zirconocene dichloride and sec-butyllithium, and a combination of tetrabutoxytitanate and dimethyl magnesium. Further examples of the homogeneous catalyst include a noble metal complex catalyst such as dichlorobis(triphenylphosphine)palladium, chlorohydridocarbonyltris(triphenylphosphine)ruthenium, bis(tricyclohexylphosphine)benzylidineruthenium(IV) dichloride, and chlorotris(triphenylphosphine)rhodium.

Examples of an inhomogeneous catalyst include nickel, palladium, platinum, rhodium, and ruthenium, and a solid catalyst in which a metal among these metals is supported on a carrier such as carbon, silica, diatomaceous earth, alumina, or titanium oxide (e.g., nickel/silica, nickel/diatomaceous earth, nickel/alumina, palladium/carbon, palladium/silica, palladium/diatomaceous earth, and palladium/alumina).

The hydrogenation reaction is normally effected in an inert organic solvent. Examples of the inert organic solvent that may be used for the hydrogenation reaction include an aromatic hydrocarbon such as benzene and toluene; an aliphatic hydrocarbon such as pentane and hexane; an alicyclic hydrocarbon such as cyclohexane and decahydronaphthalene; ethers such as tetrahydrofuran and ethylene glycol dimethyl ether; and the like. The inert organic solvent may normally be the same as the solvent that is used for the polymerization reaction. Specifically, the hydrogenation catalyst may be added directly to the polymer solution, and the hydrogenation reaction then effected.

The hydrogenation reaction may be effected under different conditions depending on the hydrogenation catalyst. The reaction temperature (hydrogenation temperature) is normally −20 to +250° C., preferably −10 to +220° C., and more preferably 0 to +200° C. If the hydrogenation temperature is too low, the reaction rate (hydrogenation rate) may be too low. If the hydrogenation temperature is too high, a side reaction may occur. The hydrogen pressure is normally set to 0.01 to 20 MPa, preferably 0.05 to 15 MPa, and more preferably 0.1 to 10 MPa. If the hydrogen pressure is too low, the rate of hydrogenation may decrease to a large extent. If the hydrogen pressure is too high, it may be necessary to use a reactor that can endure high pressure (i.e., the reaction equipment may be limited). The reaction time (hydrogenation time) is not particularly limited as long as the desired hydrogenation rate can be achieved. The reaction time is normally 0.1 to 10 hours.

The hydrogenation rate (i.e., the ratio of main-chain carbon-carbon double bonds that have been hydrogenated) of the crystalline cycloolefin ring-opening polymer is not particularly limited, but is preferably 70% or more, more preferably 80% or more, particularly preferably 90% or more, and most preferably 99% or more. The heat resistance of the hydrogenated crystalline cycloolefin ring-opening polymer (A) is improved as the hydrogenation rate increases.

The hydrogenated crystalline cycloolefin ring-opening polymer (A) that is produced as described above includes a repeating unit (represented by the following formula (4) or (5)) derived from a polycyclic norbornene-based monomer that includes three or more rings.

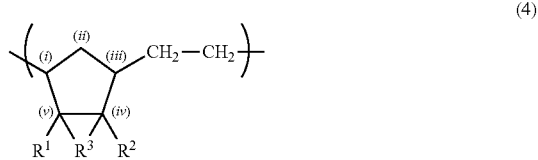

(4)

wherein each of $R^1$ and $R^2$ independently represents a hydrogen atom, a halogen atom, a substituted or unsubstituted hydrocarbon group having 1 to 20 carbon atoms, or a substituent that includes a silicon atom, an oxygen atom, or a nitrogen atom, provided that $R^1$ and $R^2$ are optionally bonded to each other to form a ring, and $R^3$ represents a substituted or unsubstituted divalent hydrocarbon group having 1 to 20 carbon atoms.

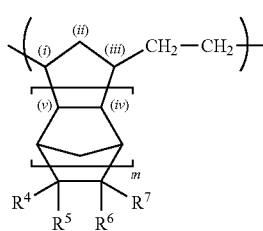

(5)

wherein $R^1$ to $R^7$ and m are the same as defined above.

The hydrogenated crystalline cycloolefin ring-opening polymer (A) that is produced as described above maintains the syndiotacticity of the ring-opening polymer that has been subjected to the hydrogenation reaction. Therefore, the resulting hydrogenated crystalline cycloolefin ring-opening polymer (A) has syndiotacticity. The ratio of racemo diads in the hydrogenated crystalline cycloolefin ring-opening polymer (A) is not particularly limited as long as the hydrogenated crystalline cycloolefin ring-opening polymer (A) has crystallinity, but is normally 60% or more, preferably 65% or more, and more preferably 70 to 99%.

Since the tacticity of a polymer does not change due to a hydrogenation reaction, a hydrogenated crystalline cycloolefin ring-opening polymer (A) having syndiotacticity and crystallinity can be obtained by hydrogenating a cycloolefin ring-opening polymer having syndiotacticity.

A polymer composition that is prepared using the hydrogenated crystalline cycloolefin ring-opening polymer (A) having syndiotacticity can produce a formed article that is rarely deformed due to heat. Note that the ratio of racemo diads in the hydrogenated crystalline cycloolefin ring-opening polymer (A) depends on the ratio of racemo diads in the crystalline cycloolefin ring-opening polymer that is subjected to the hydrogenation reaction.

The ratio of racemo diads in the hydrogenated crystalline cycloolefin ring-opening polymer (A) may be quantitatively determined by measuring the $^{13}C$-NMR spectrum of the hydrogenated crystalline cycloolefin ring-opening polymer (A), and analyzing the spectral data. The ratio of racemo diads is quantitatively determined using an appropriate method taking account of the type of polymer. For example, the ratio of racemo diads in a hydrogenated dicyclopentadiene ring-opening polymer may be determined by subjecting the hydrogenated dicyclopentadiene ring-opening polymer to $^{13}C$-NMR analysis at 200° C. using a 1,3,5-trichlorobenzene-d3/o-dichlorobenzene-d4 (volume ratio: 2/1) mixed solvent as a solvent, and calculating the ratio of racemo diads from the intensity ratio of the signal at 43.35 ppm (that is attributed to meso diads) to the signal at 43.43 ppm (that is attributed to racemo diads).

The melting point of the hydrogenated crystalline cycloolefin ring-opening polymer (A) used in connection with one embodiment of the invention is not particularly limited as long as the hydrogenated cycloolefin ring-opening polymer (A) has crystallinity, but is preferably 200° C. or more, and more preferably 230 to 290° C. A polymer composition that exhibits formability and heat resistance in a well-balanced manner can be obtained by utilizing the hydrogenated crystalline cycloolefin ring-opening polymer that has a melting point within the above range. The melting point of the hydrogenated crystalline cycloolefin ring-opening polymer (A) can be adjusted by adjusting the degree of syndiotacticity (i.e., the ratio of racemo diads) of the hydrogenated crystalline cycloolefin ring-opening polymer (A), or appropriately selecting the type of monomer, for example.

Glass Filler (B)

A known glass filler may be used as the glass filler (B) that is used in connection with one embodiment of the invention. The shape of the glass filler (B) is not particularly limited. Examples of the glass filler (B) include a glass fiber, a glass bead, a glass powder, a glass flake, a glass balloon, and the like. It is preferable to use a glass fiber from the viewpoint of the mechanical strength of the resulting formed article. The shape and the form of the glass fiber used in connection with one embodiment of the invention are not particularly limited. Specific examples of the glass fiber include a milled fiber, a cut fiber, a chopped strand, a roving, and the like. Among these, a chopped strand is particularly preferable from the viewpoint of the mechanical strength of the resulting formed article, and ease of handling.

The length of the glass fiber used in connection with one embodiment of the invention is preferably 3 to 40 mm, and more preferably 5 to 30 mm. If the length of the glass fiber is small, the resulting formed article may exhibit low mechanical strength. If the length of the glass fiber is great, a problem may occur with regard to handling during kneading. The glass fiber used in connection with one embodiment of the invention may have an arbitrary (e.g., circular, elliptical, flat, or rectangular) cross-sectional shape. Glass fibers that differ in cross-sectional shape may be used in an arbitrary ratio. The glass filler used in connection with one embodiment of the invention may have been surface-treated with a silane-based compound, an epoxy-based compound, a urethane-based compound, or the like.

The polymer composition according to one embodiment of the invention includes the glass filler (B) in a ratio of 5 to 100 parts by weight, and preferably 10 to 60 parts by weight, based on 100 parts by weight of the hydrogenated crystalline cycloolefin ring-opening polymer (A). If the amount of glass filler is too small, deterioration in reflow heat resistance and a decrease in the strength of the resulting formed article may occur. If the amount of glass filler is too large, an increase in dielectric loss tangent and deterioration in formability may occur.

Metal Oxide (C)

The metal oxide (C) is a metal oxide that forms metal nuclei upon application of electromagnetic radiation. The metal oxide (C) is a metal-containing (inorganic or organic) compound that undergoes a chemical reaction as a result of absorbing electromagnetic radiation to release the metal. Note that electromagnetic radiation may be absorbed by another substance, and the absorbed energy may be transmitted to the metal-containing compound to release the metal, instead of allowing the metal-containing compound to directly absorb electromagnetic radiation. It is preferable to use electromagnetic radiation derived from a laser beam as the electromagnetic radiation so that heavy metal nuclei are released. The wavelength of the electromagnetic radiation may be selected from various wavelengths disclosed in paragraph 0017 of Patent Literature 1 (JP-T-2004-534408).

A metal oxide that is insoluble and stable with respect to an aqueous acidic or alkaline metalization bath is preferable as the metal oxide (C). A metal oxide that absorbs most of the light having the wavelength of the incident light is more preferable as the metal oxide (C). A transition metal oxide is particularly preferable as the metal oxide (C). A transition metal oxide represented by $AB_2O_4$ or $B(AB)O_4$ that includes at least two cations that differ in type, and has a spinel structure or a spinel-like structure (that is described in detail in paragraph 0019 of Patent Literature 2 (JP-T-2010-536947)) is preferable as the transition metal oxide. Note that A in the above formula is a divalent metal cation, and is selected from the group consisting of cadmium, zinc, copper, cobalt, magnesium, tin, titanium, iron, aluminum, nickel, manganese, chromium, and a combination of two or more elements among these elements. B in the above formula is a trivalent metal cation, and is selected from the group consisting of cadmium, manganese, nickel, zinc, copper, cobalt, magnesium, tin, titanium, iron, aluminum, chromium, and a combination of two or more elements among these elements. A spinel-type copper-containing metal oxide (e.g., $CuCr_2O_4$) is most preferable. A spinel-type copper-containing metal oxide is available on the market. A spinel-type manganese-containing metal oxide is also preferable as the spinel oxide. The metal oxides having a spinel structure may be used alone or in combination. The transition metal oxide represented by $AB_2O_4$ or $B(AB)O_4$ that has a spinel structure or a spinel-like structure may include another metal in a ratio of 5 wt % or less.

The polymer composition according to one embodiment of the invention includes the metal oxide (C) in a ratio of 5 to 20 parts by weight, and preferably 6 to 10 parts by weight, based on 100 parts by weight of the hydrogenated crystalline cycloolefin ring-opening polymer (A). When the ratio of the metal oxide (C) is within the above range, it is possible to obtain a plating layer having a sufficient thickness due to high plating-forming capability.

Talc (D)

The polymer composition according to one embodiment of the invention may include talc (D) in addition to the hydrogenated crystalline cycloolefin ring-opening polymer (A), the glass filler (B), and the metal oxide (C).

The talc may be selected from talc that is normally mixed into a resin. It is preferable to use talc having a small particle size.

The polymer composition according to one embodiment of the invention normally includes the talc in a ratio of 1 to 20 parts by weight, and preferably 5 to 15 parts by weight, based on 100 parts by weight of the hydrogenated crystalline cycloolefin ring-opening polymer (A). When the ratio of the talc is within the above range, adhesion to plating and strength are highly balanced.

The polymer composition according to one embodiment of the invention may include an additional additive. The additional additive is not particularly limited as long as the additional additive is normally used for a thermoplastic resin material. Examples of the additional additive include a thermoplastic elastomer, an antioxidant, a UV absorber, a light stabilizer, a near-infrared absorber, a release agent, a coloring agent (e.g., dye and pigment), a plasticizer, an antistatic agent, a fluorescent whitening agent, an inorganic filler other than a glass filler and talc, and the like. It is preferable to add a thermoplastic elastomer in order to increase strength.

The hydrogenated crystalline cycloolefin ring-opening polymer (A), the glass filler (B), the metal oxide (C), and an optional additive may be mixed using an arbitrary method as long as the additive is sufficiently dispersed in the polymer. The hydrogenated crystalline cycloolefin ring-opening polymer (A), the glass filler (B), the metal oxide (C), and an optional additive may be added in an arbitrary order. Examples of the mixing method include a method that mixes (kneads) the resin in a molten state using a mixer, a single-screw kneader, a twin-screw kneader, a roll, a Brabender, an extruder, or the like, a method that dissolves the resin in an appropriate solvent to effect dispersion, and removes the solvent using a coagulation method, a casting method, or a direct drying method, and the like.

When the resin is mixed (kneaded) using a twin-screw kneader, the resulting mixture (kneaded product) is normally extruded in the shape of a rod in a molten state, and cut (pelletized) to have an appropriate length using a strand cutter.

2) Formed Article

A formed article according to one embodiment of the invention includes (is produced using) the polymer composition according to one embodiment of the invention. The formed article according to one embodiment of the invention preferably functions as a high-frequency dielectric antenna.

The formed article according to one embodiment of the invention may be produced by forming the polymer composition according to one embodiment of the invention using a known forming method that is used for a thermoplastic resin (e.g., injection forming (molding) method, extrusion method, cast forming (molding) method, inflation forming (molding) method, blow forming (molding) method, vacuum forming (molding) method, press forming (molding) method, compression forming (molding) method, rotational forming (molding) method, calendering method, roll forming (molding) method, or cutting method).

It is preferable to use an injection forming (molding) method or a press forming (molding) method due to excellent dimensional accuracy and a capability to form an aspherical shape or the like, and it is particularly preferable to use an injection forming (molding) method.

A conductive pattern can be formed on the surface of the resulting formed article by applying electromagnetic radiation so that conductive tracks having an arbitrary pattern are formed to form metal nuclei from the metal oxide, and effecting electroless plating.

EXAMPLES

The invention is further described below by way of examples and comparative examples. Note that the invention is not limited to the following examples. The units "parts" and "%" used in connection with the examples and the comparative examples respectively refer to "parts by weight" and "wt %" unless otherwise indicated.

In the examples and the comparative examples, the properties were measured as described below.

(1) Molecular Weight (Weight Average Molecular Weight and Number Average Molecular Weight) of Cycloolefin Ring-opening Polymer The molecular weight (weight average molecular weight and number average molecular weight) of the cycloolefin ring-opening polymer was determined as a polystyrene-equivalent value using a gel permeation chromatography (GPC) system "HLC-8220" (manufactured by Tosoh Corporation) and an H-type column (manufactured by Tosoh Corporation) (eluent: tetrahydrofuran, measurement temperature: 40° C.).

(2) Hydrogenation Rate of Hydrogenated Cycloolefin Ring-opening Polymer

The hydrogenation rate of the hydrogenated cycloolefin ring-opening polymer was determined by $^1$H-NMR measurement.

(3) Melting Point of Hydrogenated Cycloolefin Ring-opening Polymer

The melting point of the hydrogenated cycloolefin ring-opening polymer was measured using a differential scanning calorimeter at a heating rate of 10° C./min.

(4) Ratio of Racemo Diads in Hydrogenated Cycloolefin Ring-opening Polymer

The ratio of racemo diads in the hydrogenated cycloolefin ring-opening polymer was determined by subjecting the hydrogenated cycloolefin ring-opening polymer to $^{13}$C-NMR analysis at 200° C. using a 1,3,5-trichlorobenzene-d3/o-dichlorobenzene-d4 (volume ratio: 2/1) mixed solvent as a solvent, and calculating the intensity ratio of the signal at 43.35 ppm (that is attributed to meso diads) to the signal at 43.43 ppm (that is attributed to racemo diads).

(5) Dielectric Loss Tangent

The dielectric loss tangent of the specimen 1 was measured using a network analyzer ("N5230A" manufactured by Agilent Technologies) in accordance with ASTM D2520 (cylindrical cavity resonator method). The measurement frequency was set to 1 GHz. The electrical properties were evaluated as "Good" when the dielectric loss tangent was less than 0.002.

(6) Reflow Heat Resistance

The reflow heat resistance of the specimen 2 was evaluated by heating the specimen 2 at 260° C. for 10 seconds using an oven (three times), and observing the specimen 2 with the naked eye. A case where the specimen was not deformed and melted due to heating (i.e., maintained the shape) was evaluated as "Good", and a case where the specimen was deformed and melted due to heating was evaluated as "Bad".

(7) Humidity Resistance

The specimen 2 was allowed to stand at a temperature of 85° C. and a relative humidity of 85% RH for 500 hr (i.e., subjected to an environmental test) using a thermo-hygrostat, and subjected to a flexural test in accordance with JIS K 7171 (test speed: 2 mm/min) using an autograph ("AGS-5kNJ.TCR2" manufactured by Shimadzu Corporation) to measure the flexural strength of the specimen 2. The humidity resistance was evaluated as "Good" when a change in strength due to the environmental test was less than 10%.

(8) Plating Properties

The specimen 3 was activated using a laser ("MicroLine 3D 160" manufactured by LPKF), and plated at 55° C. for 1 hr using an electroless copper plating tank ("MID Copper 100B1" manufactured by McDermid). The thickness of the resulting plating layer was measured using XRF. The plating properties were evaluated as "Good" when the thickness of the plating layer was more than 5μm.

Synthesis Example 1

A pressure-resistant reaction vessel made of glass which had been sufficiently dried and in which the internal atmosphere had been replaced by nitrogen, was charged with 40 parts of a solution (concentration: 75%) prepared by dissolving dicyclopentadiene (endo-isomer content: 99% or more) in cyclohexane (amount of dicyclopentadiene: 30 parts). After the addition of 738 parts of cyclohexane and 2.0 parts of 1-hexene, the mixture was heated to 50° C. Separately, 4.6 parts of a solution prepared by dissolving diethylaluminum ethoxide (19 wt %) in n-hexane was added to a solution prepared by dissolving 1.1 parts of a tetrachlorotungsten phenylimide-(tetrahydrofuran) complex in 56 parts of toluene, and the mixture was stirred for 10 minutes to prepare a catalyst solution. The catalyst solution was added to the reaction vessel to initiate a ring-opening polymerization reaction. 40 parts of a solution (concentration: 75%) prepared by dissolving dicyclopentadiene in cyclohexane was added to the reaction vessel nine times (every 5 minutes) while maintaining the temperature of the mixture at 50° C., and the mixture was reacted for 2 hours. After the addition of a small quantity of isopropanol to terminate the polymerization reaction, the polymer solution was poured into a large quantity of isopropanol to coagulate the polymer. The polymer thus coagulated was separated from the solution by filtration to collect the polymer.

The polymer (ring-opening polymer) was dried at 40° C. for 20 hours under reduced pressure. The yield of the polymer was 296 parts (99%). The number average molecular weight (Mn) and the weight average molecular weight (Mw) of the polymer were respectively 10,100 and 17,200, and the molecular weight distribution (Mw/Mn) calculated from the number average molecular weight (Mn) and the weight average molecular weight (Mw) was 1.70. A pressure-resistant reaction vessel was charged with 60 parts of the polymer and 261 parts of cyclohexane, and the mixture was stirred to dissolve the polymer in cyclohexane. After the addition of a hydrogenation catalyst solution prepared by dissolving 0.039 parts of chlorohydridocarbonyltris(triphenylphosphine)ruthenium in 40 parts of toluene, a hydrogenation reaction was effected at 160° C. for 5 hours under a hydrogen pressure of 4 MPa. The resulting reaction mixture was poured into a large quantity of isopropyl alcohol to completely precipitate the polymer, which was filtered off, washed, and dried at 60° C. for 24 hours under reduced pressure to obtain a hydrogenated crystalline cycloolefin ring-opening polymer A.

The hydrogenation rate of the hydrogenated crystalline cycloolefin ring-opening polymer A was 99% or more, and the ratio of racemo diads in the hydrogenated crystalline cycloolefin ring-opening polymer A was 85%. The melting point of the hydrogenated crystalline cycloolefin ring-opening polymer A was 265° C. The resulting ring-opening polymer had a number average molecular weight (Mn) of 14,200, a weight average molecular weight (Mw) of 27,000, and a molecular weight distribution (Mw/Mn) of 1.90.

Synthesis Example 2

A reaction vessel which had been sufficiently dried and in which the internal atmosphere had been replaced by nitrogen, was charged with 300 parts of dehydrated cyclohexane, 0.5 parts of 1-hexene, 0.15 parts of dibutyl ether, and 1.5 parts of a solution (concentration: 10 wt %) prepared by dissolving triisobutylaluminum in cyclohexane, and the mixture was heated to 40° C. A mixture including 70 parts of tetracyclododecene and 30 parts of dicyclopentadiene, and 11 parts of a solution (concentration: 0.6 wt %) prepared by dissolving tungsten hexachloride in cyclohexane, were continuously added to the reaction mixture at the same time while maintaining the reaction mixture at 40° C. with stirring to effect a polymerization reaction. 0.5 parts of butyl glycidyl ether and 0.2 parts of isopropyl alcohol were added to the mixture to terminate the polymerization reaction.

400 parts of the reaction mixture was transferred to a pressure-resistant reactor equipped with a stirrer. After the addition of 4 parts of a nickel catalyst supported on diatomaceous earth ("T8400RL" manufactured by Süd-Chemie Catalysts, nickel content: 57%), the mixture was mixed.

After replacing the atmosphere inside the reactor by hydrogen gas, hydrogen was supplied to the reactor while stirring the mixture to effect a hydrogenation reaction at 170° C. for 5 hours under a pressure of 4.5 MPa.

After filtering the reaction solution to remove the hydrogenation catalyst, 0.1 parts of pentaerythrityl tetrakis[3-(3,5-di-t-butyl-4-hydroxyphenyl)propionate] was added to the filtrate, and dissolved therein. A volatile component was evaporated using a thin film evaporator ("Filmtruder" manufactured by Buss) at a temperature of 260° C. (533° K) for a residence time of 1.2 hours under a pressure of 1 kPa or less to obtain a hydrogenated tetracyclododecene-dicyclopentadiene ring-opening copolymer B.

The hydrogenated tetracyclododecene-dicyclopentadiene ring-opening copolymer B had a glass transition temperature of 142° C. The hydrogenated tetracyclododecene-dicyclopentadiene ring-opening copolymer B had a number average molecular weight (Mn) of 18,300, a weight average molecular weight (Mw) of 42,000, and a molecular weight distribution (Mw/Mn) of 2.3. The hydrogenation rate of the hydrogenated tetracyclododecene-dicyclopentadiene ring-opening copolymer B was 99% or more.

Synthesis Example 3

Adipic acid (manufactured by Rhodia) was heated and melted in a reaction can containing a nitrogen atmosphere, and heated to 270° C. while gradually adding a mixed diamine including p-xylylenediamine (manufactured by Mitsubishi Gas Chemical Company, Inc.) and m-xylylenediamine (manufactured by Mitsubishi Gas Chemical Company, Inc.) (molar ratio: 3:7) dropwise to the reaction can under a pressure of 0.35 MPa so that the molar ratio of diamine and adipic acid was about 1:1. After completion of the dropwise addition, the pressure was reduced to 0.06 MPa, and the mixture was reacted for 10 minutes to adjust the amount of components having a molecular weight of 1,000 or less. A polyamide resin was thus obtained. The polyamide resin had a melting point of 255° C.

Example 1

100 parts of the hydrogenated cycloolefin ring-opening polymer A, 30 parts of glass fibers ("CSG3PA-830" manufactured by Nitto Boseki Co., Ltd.), 0.8 parts of IRGANOX (registered trademark) 1010 (manufactured by BASF), 6 parts of a metal oxide ("Black 3702" manufactured by Asahi Sangyo), and 10 parts of a filler ("SG-95" manufactured by Nippon Talc Co., Ltd.) were mixed using a blender. The mixture was kneaded using a twin-screw kneader ("TEM-35B" manufactured by Toshiba Machine Co., Ltd.) at 290° C. and 100 rpm for 2 minutes to obtain pellets.

The pellets were subjected to injection molding using a micro-injection molding machine ("Micro Injection Moulding Machine 10 cc" manufactured by DSM Xplore) (molding temperature: 290° C., injection pressure: 0.7 MPa, mold temperature: 150° C., holding time: 10 sec) to prepare a specimen 1 having a length of 80 mm, a width of 10 mm, and a thickness of 4 mm, a specimen 2 having a length of 100 mm, a width of 1 mm, and a thickness of 1 mm, and a specimen 3 having a length of 60 mm, a width of 60 mm, and a thickness of 2 mm. The details of the composition and the evaluation results are listed in Table 1.

Examples 2 to 4 and Comparative Examples 1 to 6

A formed article was produced in the same manner as in Example 1, except that the composition was changed as shown in Table 1, and evaluated in the same manner as described above. The evaluation results are listed in Table 1.

TABLE 1

| | Example | | | | Comparative Example | | | | | |
|---|---|---|---|---|---|---|---|---|---|---|
| | 1 | 2 | 3 | 4 | 1 | 2 | 3 | 4 | 5 | 6 |
| Hydrogenated ring-opening polymer A | 100 | 100 | 100 | 100 | 100 | 100 | 100 | 100 | | |
| Hydrogenated ring-opening polymer B | | | | | | | | | 100 | |
| Polyamide resin | | | | | | | | | | 100 |
| Glass fiber | 30 | 80 | 30 | 30 | 0 | 120 | 30 | 30 | 30 | 30 |
| Metal oxide | 6 | 6 | 10 | 15 | 6 | 6 | 2 | 30 | 6 | 6 |
| Filler | 10 | 10 | 10 | 15 | 10 | 10 | 5 | 30 | 10 | 10 |
| Evaluation results | | | | | | | | | | |
| Dielectric loss tangent | 0.0012 | 0.0015 | 0.0017 | 0.0018 | 0.0008 | 0.0023 | 0.0010 | 0.0022 | 0.0012 | 0.0120 |
| Reflow resistance | Good | Good | Good | Good | Bad | Good | Good | Good | Bad | Good |
| Plating thickness (μm) | 5.8 | 5.5 | 6.2 | 6.4 | 5.9 | 5.2 | 2.1 | 7.0 | 5.8 | 6.0 |
| Change in strength | Good | Good | Good | Good | Good | Good | Good | Good | Good | Bad |

As is clear from Table 1, the polymer compositions according to the invention (Examples 1 to 4) exhibited excellent electrical properties, plating properties, and reflow resistance, and showed only a small change in strength due to absorption of moisture. On the other hand, deformation was observed during the reflow test when the amount of glass filler was small (Comparative Example 1), and deterioration in electrical properties occurred when the amount of glass filler was large (Comparative Example 2). Deterioration in electrical properties occurred when the amount of metal oxide and the amount of filler were large, and deterioration in plating properties occurred when the amount of metal oxide and the amount of filler were small (Comparative Examples 3 and 4). The reflow resistance could not be obtained when a hydrogenated alicyclic structure-containing polymer was used instead of a hydrogenated crystalline cycloolefin ring-opening polymer (Comparative Example 5). Deterioration in electrical properties occurred, and a change in strength due to absorption of moisture occurred to a large extent when a polyamide resin was used (Comparative Example 6).

The invention claimed is:

1. A polymer composition comprising a hydrogenated crystalline cycloolefin ring-opening polymer (A) that comprises a repeating unit derived from a polycyclic norbornene-based monomer that includes three or more rings, 5 to 100 parts by weight of a glass filler (B) based on 100 parts by weight of the hydrogenated crystalline cycloolefin ring-opening polymer (A), and 5 to 20 parts by weight of a metal oxide (C) based on 100 parts by weight of the hydrogenated crystalline cycloolefin ring-opening polymer (A), wherein the metal oxide is a copper-containing metal oxide having a spinel structure.

2. The polymer composition according to claim 1, wherein the metal oxide is $CuCr_2O_4$ having a spinel structure.

3. The polymer composition according to claim 1, further comprising 1 to 20 parts by weight of talc (D).

4. A formed article comprising the polymer composition according to claim 1.

5. A formed article comprising the polymer composition according to claim 1, and functioning as a high-frequency dielectric antenna.

* * * * *